(12) United States Patent  (10) Patent No.: US 8,786,603 B2
Rasmussen et al.  (45) Date of Patent: Jul. 22, 2014

(54) ANCESTOR-TO-ANCESTOR RELATIONSHIP LINKING METHODS AND SYSTEMS

(75) Inventors: Matt Rasmussen, Provo, UT (US); Harold Madsen, Provo, UT (US); Gary Mangum, Provo, UT (US)

(73) Assignee: Ancestry.com Operations Inc., Provo, UT (US)

( * ) Notice: Subject to any disclaimer, the term of this patent is extended or adjusted under 35 U.S.C. 154(b) by 207 days.

(21) Appl. No.: 13/035,845

(22) Filed: Feb. 25, 2011

(65) Prior Publication Data

US 2012/0218289 A1    Aug. 30, 2012

(51) Int. Cl.
*G06F 3/048* (2013.01)
*G06T 11/20* (2006.01)

(52) U.S. Cl.
USPC .......................................... 345/440; 715/855

(58) Field of Classification Search
USPC .......................................... 345/440; 715/700
See application file for complete search history.

(56) References Cited

U.S. PATENT DOCUMENTS

| | | | |
|---|---|---|---|
| 6,570,567 B1 | 5/2003 | Eaton | |
| 7,257,776 B2 | 8/2007 | Bailey et al. | |
| 7,791,770 B2 * | 9/2010 | Nomura | 358/474 |
| 8,224,862 B2 | 7/2012 | Sacks | |
| 2001/0054089 A1 * | 12/2001 | Tso et al. | 709/219 |
| 2003/0193481 A1 | 10/2003 | Sokolsky | |
| 2008/0168357 A1 * | 7/2008 | Firebaugh et al. | 715/737 |
| 2008/0288886 A1 * | 11/2008 | Sherwood et al. | 715/772 |
| 2009/0031239 A1 * | 1/2009 | Coleran et al. | 715/771 |
| 2009/0152349 A1 | 6/2009 | Bonev et al. | |
| 2009/0172603 A1 * | 7/2009 | Young Suk Lee | 715/854 |
| 2009/0198725 A1 | 8/2009 | Lee et al. | |
| 2009/0249257 A1 | 10/2009 | Bove et al. | |
| 2009/0292989 A1 | 11/2009 | Matthews et al. | |
| 2010/0083173 A1 | 4/2010 | Germann et al. | |
| 2010/0185949 A1 | 7/2010 | Jaeger | |
| 2010/0199222 A1 | 8/2010 | Kranik et al. | |
| 2011/0072009 A1 * | 3/2011 | Tuttle et al. | 707/722 |
| 2011/0148878 A1 * | 6/2011 | Baikie | 345/440 |
| 2011/0161805 A1 | 6/2011 | Slinker | |
| 2011/0231796 A1 | 9/2011 | Vigil | |
| 2012/0054190 A1 | 3/2012 | Peters | |
| 2012/0062564 A1 | 3/2012 | Miyashita et al. | |

\* cited by examiner

*Primary Examiner* — Carlos Perromat
(74) *Attorney, Agent, or Firm* — Kilpatrick Townsend & Stockton LLP

(57) ABSTRACT

Methods, devices and systems for implementing an interactive display of ancestor-to-ancestor relationships are presented. The method includes displaying on a display device of a computer system, a user interface for displaying one or more genealogical charts including one or more nodes. The method further includes receiving, from an input device of the computer system, a selection of a first node and a second node. Then, in response to receiving the selection of the first and second nodes, the method includes calculating a sequence of relationships connecting the first node to the second node. Finally, the method includes organizing the sequence of relationships into one or more steps, wherein each step contains a sequential subset of nodes and relationships that can be displayed at the same time, and sequentially displaying the nodes and relationships in each step on the display device.

21 Claims, 16 Drawing Sheets

US 8,786,603 B2

ANCESTOR-TO-ANCESTOR RELATIONSHIP LINKING METHODS AND SYSTEMS

BACKGROUND OF THE INVENTION

Interest in genealogical research has grown tremendously over the last century and has become a popular hobby among all age groups. Much of the excitement surrounding genealogy stems from a researcher's ability to study the various relationships within their family trees—to see who they are related to and how. When a researcher discovers that they are in some way related to another individual, it is common for the researcher to desire to understand the exact nature of that relationship.

Previously, methods for displaying a relationship between two people within a family tree structure were accomplished using a single screen display or, more commonly, a textual description. Although some relationship queries are simple, many are complex, involving multiple generations and/or spanning various branches of a family tree. A textual description of a complex relationship could easily become so complicated and lengthy that it was of little use in describing the relationship in a meaningful way.

Rare attempts to describe a complex relationship visually resulted in shrinking the information that was available for each node in the tree, sometimes to the point that it was difficult to discern anything other than the general direction of the relationship. This resulted in a loss of context about the specific turns along a genealogical chart that a relationship might take. Unfortunately, this display problem becomes more exaggerated as modern personal computing transitions in part to more mobile devices, such as smart phones and tablet computers, which offer increasingly smaller display screens. Both casual and dedicated genealogical researchers have found this process frustrating and it threatens to dampen their enthusiasm for further research. The following invention serves to remedy these and other problems.

BRIEF SUMMARY OF THE INVENTION

Devices, systems, and methods are described for a novel interactive linking of ancestor-to-ancestor relationships.

In some embodiments, a method for implementing an interactive display of ancestor-to-ancestor relationships is presented. The method includes displaying on a display device of a computer system, a user interface for displaying one or more genealogical charts including one or more nodes. The method further includes receiving, from an input device of the computer system, a selection of a first node and a second node. Then, in response to receiving the selection of the first and second nodes, the method includes calculating a sequence of relationships connecting the first node to the second node. Finally, the method includes organizing the sequence of relationships into one or more steps, wherein each step contains a sequential subset of nodes and relationships that can be displayed at the same time, and sequentially displaying the nodes and relationships in each step on the display device.

In still other embodiments, a computer-readable storage medium having a computer-readable program embodied therein for directing operation of a computer system, including a processor and a storage device is presented. The computer-readable medium includes instructions for operating the computer to display a user interface for displaying one or more genealogical charts including one or more nodes. The computer-readable medium further includes instructions to receive a selection of a first node and a second node. In response to receiving the selection of the first and second nodes, the computer-readable medium additionally may include instructions to calculate a sequence of relationships connecting the first node to the second node. Moreover, the computer-readable medium may include instructions to organize the sequence of relationships into one or more steps, wherein each step contains a sequential subset of nodes and relationships that can be displayed at the same time, and sequentially display the nodes and relationships in each step.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components.

DETAILED DESCRIPTION OF THE INVENTION

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

A set of embodiments provides solutions (including without limitation, devices, systems, methods, software programs, and the like) for implementing a method for the interactive display of linking ancestor-to-ancestor relationships. Instead of displaying only a textual description of how two individuals in a genealogical tree are related to each other, aspects of the present invention improve the prior art by allowing the user to graphically see both a top-level view of the connecting relationships, and a relationship-level view of each turn in a relationship pathway.

Figure 1:
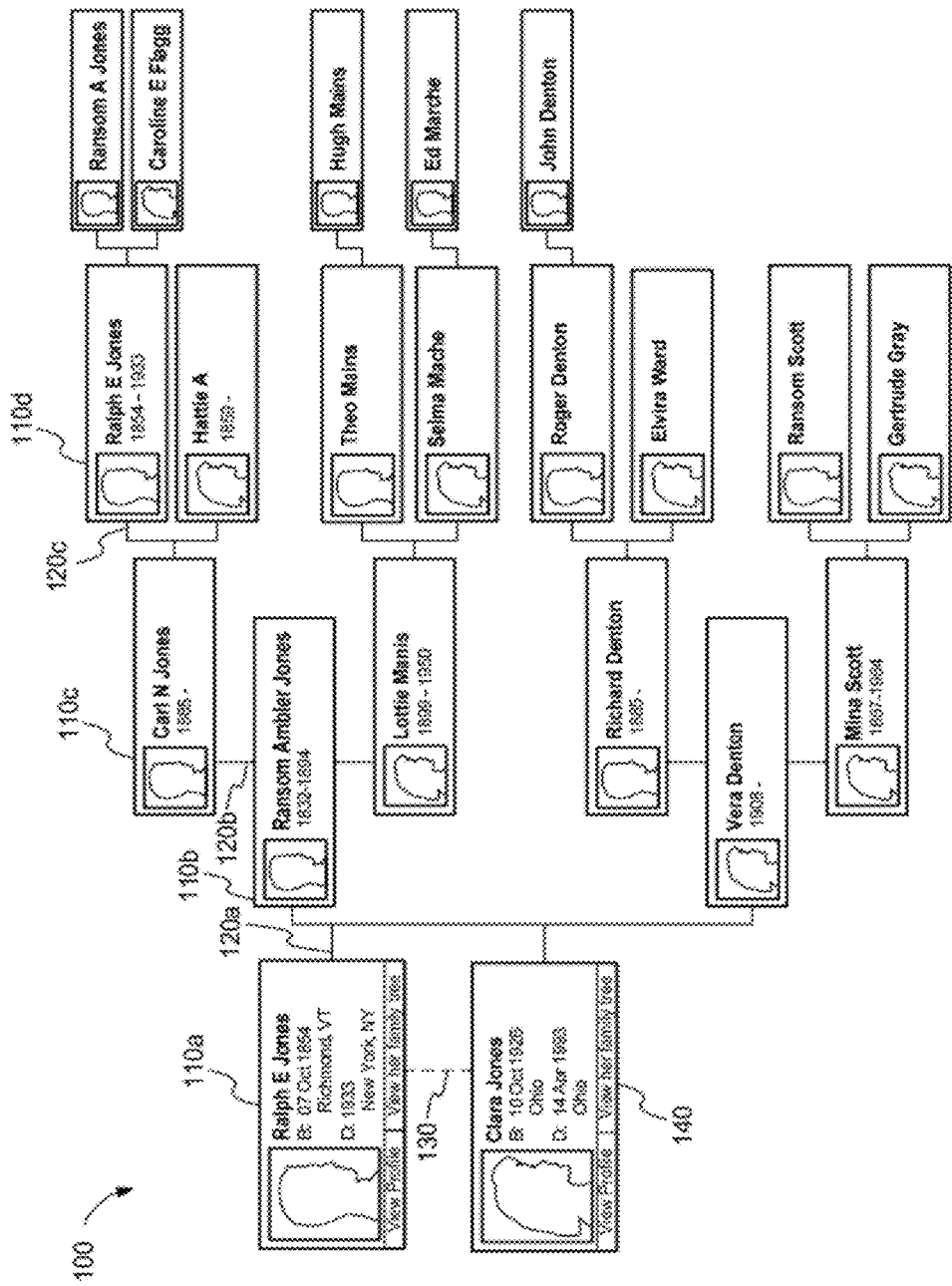
FIG. 1 is an embodiment of a genealogical chart or form that can be used to record family relationships.

To begin, family relationships for genealogical research may be stored and displayed in one or more genealogical charts. FIG. 1 illustrates an embodiment of a chart 100 that can be used to display family relationships. Genealogical charts representing family trees may be displayed on the screen of a computer system. Each node 110 in the chart represents a person within the family, and a set of lines 120 and 130 connecting the nodes represent family relationships that connect the various family members to each other within the family structure. Such relationships may consist of sibling, parent, or child relationships, and/or the like. By way of example, node 110a represents a single family member, and relationship 120a represents a parent-child relationship between the parent 110b and a child 110a.

The view of the genealogical tree shown in FIG. 1 displays enough detail to convey information regarding a particular family line. However, the number of nodes added to the family line may increase as more individuals are added to the family, increasing the number of nodes that must be simultaneously displayed if the entire family line is to be viewed at once. Consequently, a graphical representation of a genealogical chart may contain various levels or views that focus on particular subdivisions of the chart. By way of example, a chart may contain four levels of viewing detail: a tree view, a branch view, a family view, and an individual view. The tree view may depict the entire tree, and may include very few visible details related to the individual nodes. When the view is changed to the next lower level, for instance, the branch view, the entire tree may no longer be in the display. Instead, the branch view may zoom in to display a group of families within the chart. In some embodiments, these may correspond to a grouping of family lines. As the display zooms in to the next lower level, for instance, the family level, the display may be limited to a single family or family line, such as the line 100 depicted in FIG. 1. Finally, the display may be zoomed in to the individual view, wherein a single individual is displayed, or where an individual is highlighted within his/her immediate family. The individual view may also be called a "detail" view wherein all the stored information related to the individual may be displayed, such as dates, videos, documents, recordings, and/or the like.

The genealogical chart may in fact be fashioned to look like an actual tree. By way of example, the top level viewing option (the tree view) may display and entire tree. Each branch may represent a different family line. The root of the tree may be a user or an another individual selected from within a larger genealogical chart for analysis. In order to navigate around the tree view, a user may provide inputs to pan up and down the display. In some embodiments, the genealogical chart may be displayed as a three-dimensional tree. In this case, a user may navigate around the tree not only by panning up and down, but also by rotating the view around the tree. This embodiment may be particularly advantageous when particular levels of the tree become very congested with nodes—a likely scenario as the user's genealogical research continues to delve deeper into the past. When the congested levels are displayed as three-dimensional tree branches, the tree may be able to display more information in way that is accessible and understandable to the user by spreading these branches around the three-dimensional trunk. In some embodiments, branches that are relatively sparse compared to other branches may be displayed in a manner that visually indicates there are fewer nodes in the branch. For example, a branch may be depicted to be smaller than other branches at the same level. Or, more populated branches may appear to be more densely filled with leaves, may be shaded in a darker color, may allow less of the background image to show through the leaves, or may use another method of distinguishing between sparse and densely populated branches.

When the user chooses to zoom to another level, such as the branch level, the display may zoom within the display level (i.e. tree view, or branch view) or in some embodiments zooming in or out may cause the display to switch between views. For example, zooming in from the tree view may cause the display to transition to the branch view. Zooming in further may cause the display to transition to the family view, and so forth.

If the genealogical chart is being displayed on a device that accepts finger gestures as an input, these may be used to provide the zoom, pan, and rotate commands for manipulating the visual representation of the genealogical chart. For example, on a tablet computer or digital smart phone, it is possible to use a finger gesture such as dragging a finger across the screen to pan the image. Likewise, a user could place two fingers on the screen and rotate them in order to rotate the image, or in some embodiments, to rotate around a three-dimensional tree. To zoom the image in or out, two fingers could be pinched or spread apart. As stated earlier, zooming in and out by pinching or spreading the fingers may zoom within the current display level, or in may cause a transition between display levels. These finger gestures can also be performed on a touch pad input device instead of the screen of the display. In absence of a touch device, a device may still accept each type of input action used to zoom, pan, and rotate from another input device such as a mouse, keyboard, and/or the like.

Returning now to the way nodes are linked in the chart, the relationship between two nodes may be more complicated than the adjacent nodes in the parent-child relationship 120a. The relationship between two nodes may span multiple generations and may be comprised of myriad legal and familial bonds. In one embodiment, a genealogical tree structure may represent these more complicated relationships using multiple nodes and interconnecting relationships to form complicated topographies. A complicated relationship may be represented as the sum of a plurality of individual relationships. For example, the relationship between node 110a and node 110d may be comprised of the nodes 110a and 110b and the relationship 120a between them (a parent-child relationship), nodes 110b and 110c and the relationship 120b between them (another parent-child relationship), and nodes 110c and 110d and the relationship 120c between them (another parent-child relationship). Because complex relationships are constructed from simpler individual relationships, understanding the simpler individual relationships and how they build upon each other may be an important way to understand complex relationships.

Complex relationships are not limited to a single direction in a family tree, i.e. they may not be constructed solely by parent-child relationships. They may also be constructed through sibling relationships, marriage and divorce relationships, adoptions, civil unions, and many other types of family relationships that may be represented in a genealogical tree. By way of example, node 110a is connected by a sibling relationship 130 to a sibling node 140. A complex relationship may thus span both the horizontal and vertical directions of a genealogical chart, traversing different generations of siblings, step-siblings, cousins, aunts/uncles, nieces/nephews, and/or the like.

Because complex relationships between two nodes can connect any two points on a genealogical tree and may be comprised of multiple simple relationships, it may often be difficult to display all of the relevant information at the same time on a single display device. Because a complex relationship may be constructed by multiple individual nodes and relationships, this relevant information may include biographical, pictorial, audio, video, documentary information, and/or the like for each of the individual nodes in the relationship pathway. In one embodiment, it may be advantageous to display some or all of this information for the various individual members that are a part of, or are closely related to, the relationship pathway between the two nodes. In another embodiment, it may also be advantageous to include a top-level view of the entire relationship connection, presented in such a way so as to allow a user to understand how the complex relationship may be formed. Therefore, in accordance with embodiments of the present invention, it may be advantageous to offer methods of displaying a complex relationship and communicating this information in such a way that a user can understand how two family members are related to one another.

Figure 2:
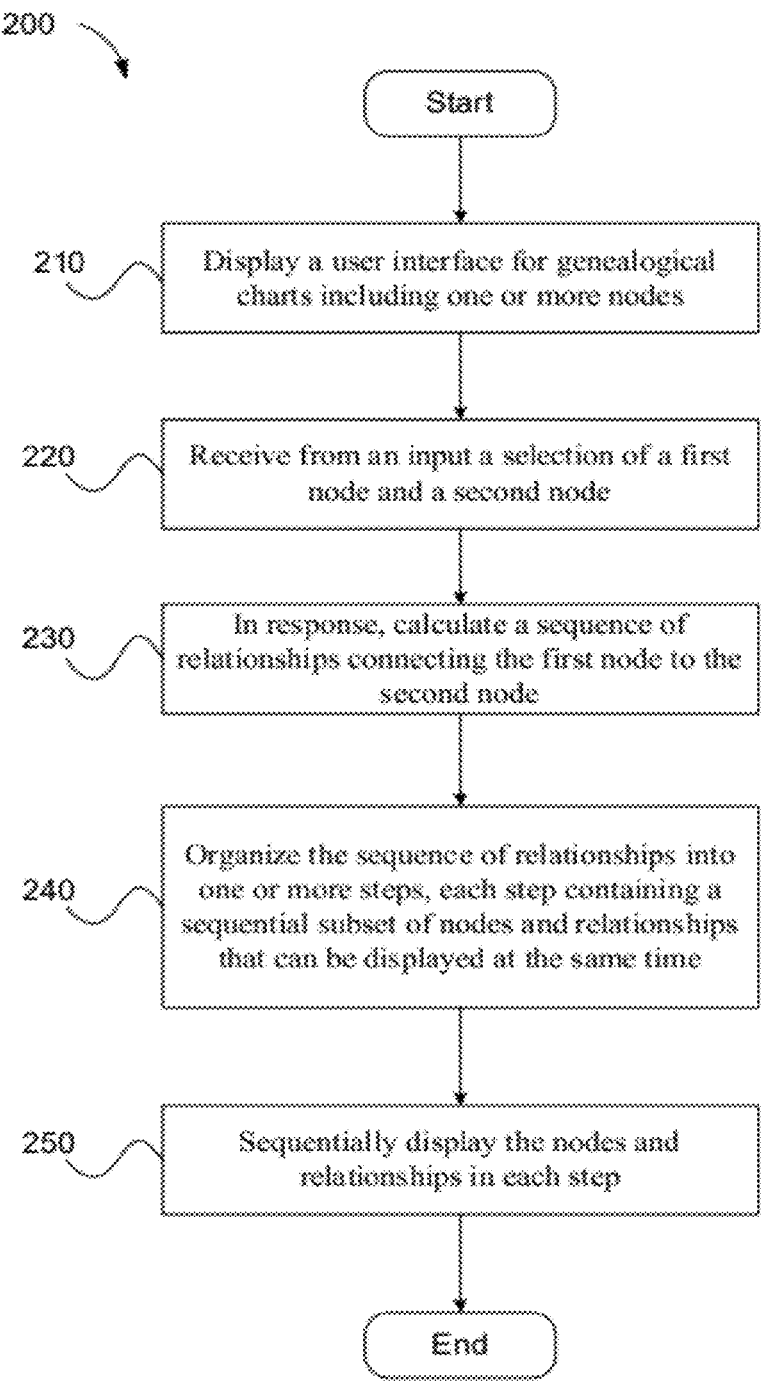
FIG. 2 is a simplified flow diagram of an embodiment of a method for implementing an interactive display of ancestor-to-ancestor relationships.

FIG. 2 is a simplified flow diagram of an embodiment of a method 200 for implementing an interactive display of ancestor-to-ancestor relationships. At block 210, a user interface may be provided for displaying one or more genealogical charts including one or more nodes. The display may include a root node, parent-child relationships, sibling relationships, etc. In one embodiment, the genealogical chart may be a directed graph. In another embodiment, the chart may be a binary directed graph.

At process block 220, an input is received that selects a first node and a second node from the displayed set of nodes, where each node represents a person within the genealogical chart. In one embodiment, the nodes may be selected graphically by a user using a mouse pointer device, touch screen, and/or the like. In another embodiment, the selected nodes may be highlighted or otherwise visually distinguished on the display after they have been selected.

Further, at process block 230, a sequence of simple relationships may be calculated that connects the first node to the second node. This sequence of simple relationships between the two nodes may form a single complex relationship comprising multiple simple relationships within the genealogical chart. In one embodiment, the complex relationship is displayed by highlighting the simple relationship connections to form a graphical path linking the two nodes.

At process block 240, the sequence of relationships may be organized into one or more steps, wherein each step contains a sequential subset of the nodes and relationships that can be displayed at the same time. In one embodiment, the first and last node in each step represents a genealogical distance equal to a grandparent-grandchild relationship.

Finally, at process block 250, each step may be displayed sequentially on the display device. The size of each step may be optimized by process block 240 such that as each step displayed on the screen, information associated with each node in the step may be displayed concurrently on the display device. In one embodiment, the date and place of birth, and the date and place of death, and a photo, as well as other similar data, are displayed with each node. Process block 250 may display each step, beginning with the step containing the first node, and ending with the step containing the second node, or vice-versa, until the entire relationship between the first and second nodes has been displayed.

Turning back to process block 210 in FIG. 2, the display of the genealogical charts may be in various formats, including text, graphical, audio, and/or the like. Preferably, the genealogical data set may be displayed as graphical chart structure. Various embodiments may contain different types of charts, including trees, binary trees, directed graphs, binary directed graphs, unorganized "brainstorm"-style diagrams, textual lists, expandable and collapsible folder views, realistic trees with records forming graphical leaves, and/or the like. This step may also use various devices with different sized displays. In some embodiments, the size of the display may influence the amount of the genealogical chart(s) that can be displayed simultaneously. Merely by way of example, the large computer displays may be able to show most of the nodes in a large genealogical chart simultaneously, while a smaller display, such as a smart phone or tablet computer, may scale the size of the individual nodes, or may alternatively display only a portion of the genealogical chart or a portion of the information associated with each node in the chart. A user may also be able to navigate around the display using various input techniques, such as vertical and/or horizontal slider bars, mouse panning, finger gestures on a touch screen, and/or the like.

Various embodiments of the present invention may next allow a user to select two genealogical records from an existing genealogical data set, or nodes in a genealogical chart, containing a plurality of such records, each record representing a person. These selections may be entered by the user, after which the system may search a genealogical data set and match the user input to an existing record. Alternatively, the system may display a genealogical data set to the user and allow the user to select an existing record. In this case, the user may use an input device associated with the system to select two nodes in the chart, the nodes representing records in the genealogical data set. Alternatively, the inputs selecting the two records may come from another system, a co-executing software routine, a web interface, and/or the like.

Figure 3:
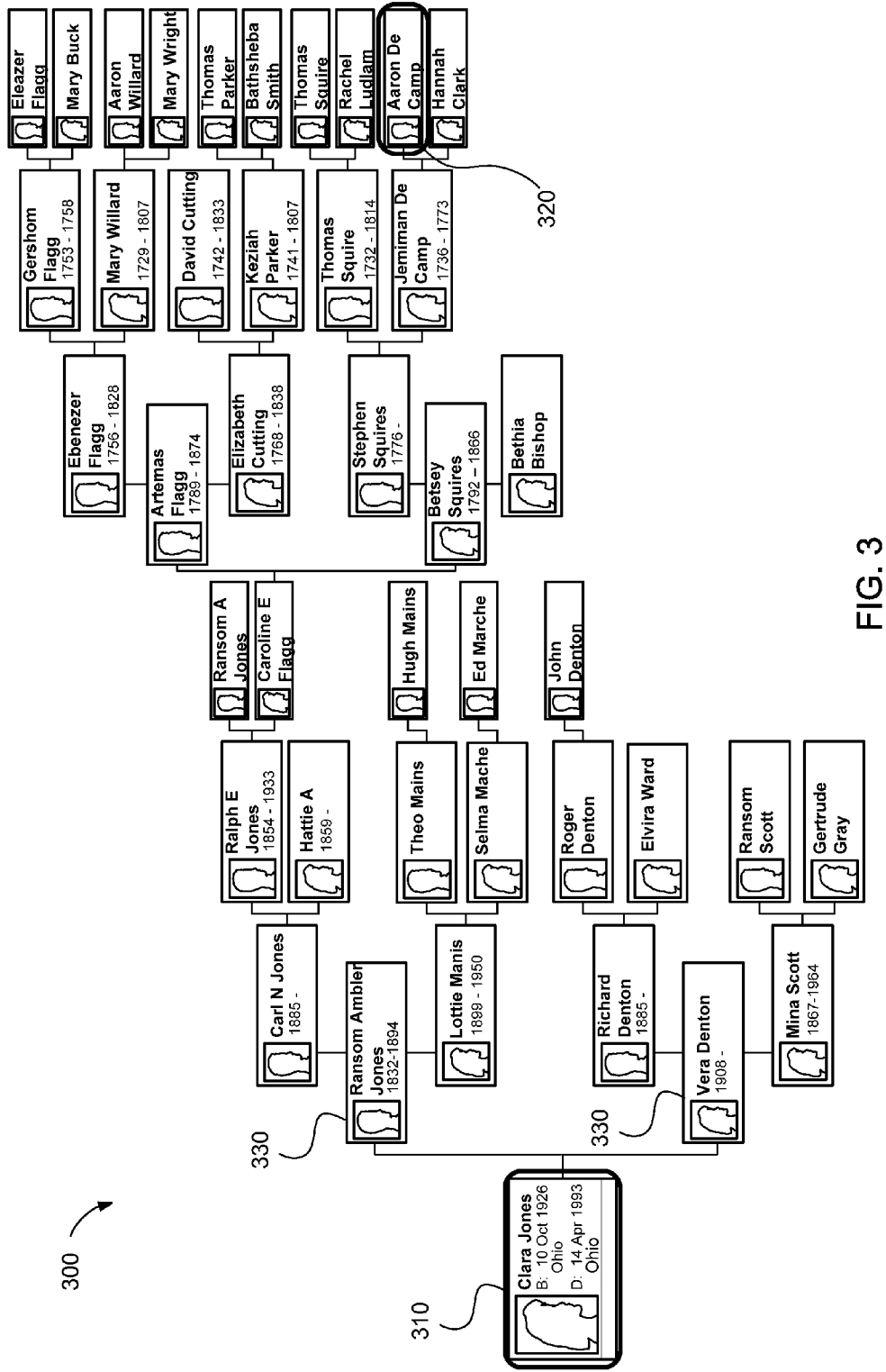
FIG. 3 is an embodiment of a genealogical tree structure where two nodes may have been selected.

FIG. 3 illustrates a genealogical tree structure 300 where a first node 310 and a second node 320 have been selected. Node 310 may be a root node in the tree. Node 310 may also represent the user. Node 310 may be highlighted by changing the color of node 310, by outlining node 310 with a heavier pattern or line weight, by adding a graphical designation to node 310 such as a star or asterisk, or by any other method that would distinguish node 310 from the surrounding nodes 330. Similarly, the second node 320 selected may also be distinguished from the surrounding nodes 330 in the display. In one embodiment, the distinguishing method for the second node 320 may be the same as that used to distinguish the first node 310. In another embodiment, the method used to distinguish the second node 320 may be different than that used to distinguish the first node 310, possibly allowing the user to visually distinguish between his/her first selection and his/her second selection.

In one embodiment, any node within chart 300 may be designated as either the first or second node. In another embodiment, node 310, the root node of the tree, may always be selected as the first or second node by default. The first or second node may be changed to a node other than root node 310, or root node 310 may always be one of the selected nodes. Similarly, the node designated as the default node may be changed, or a default node may be designated for both the first and second nodes. The terms "first node" and "second node" should be understood to be interchangeable, and to merely designate a first and second selection. For example, in FIG. 3, node 310 could represent the "first node," and node 320 could represent the "second node." Alternatively node 320 could represent the "first node," and node 310 could represent the "second node."

Figure 4:
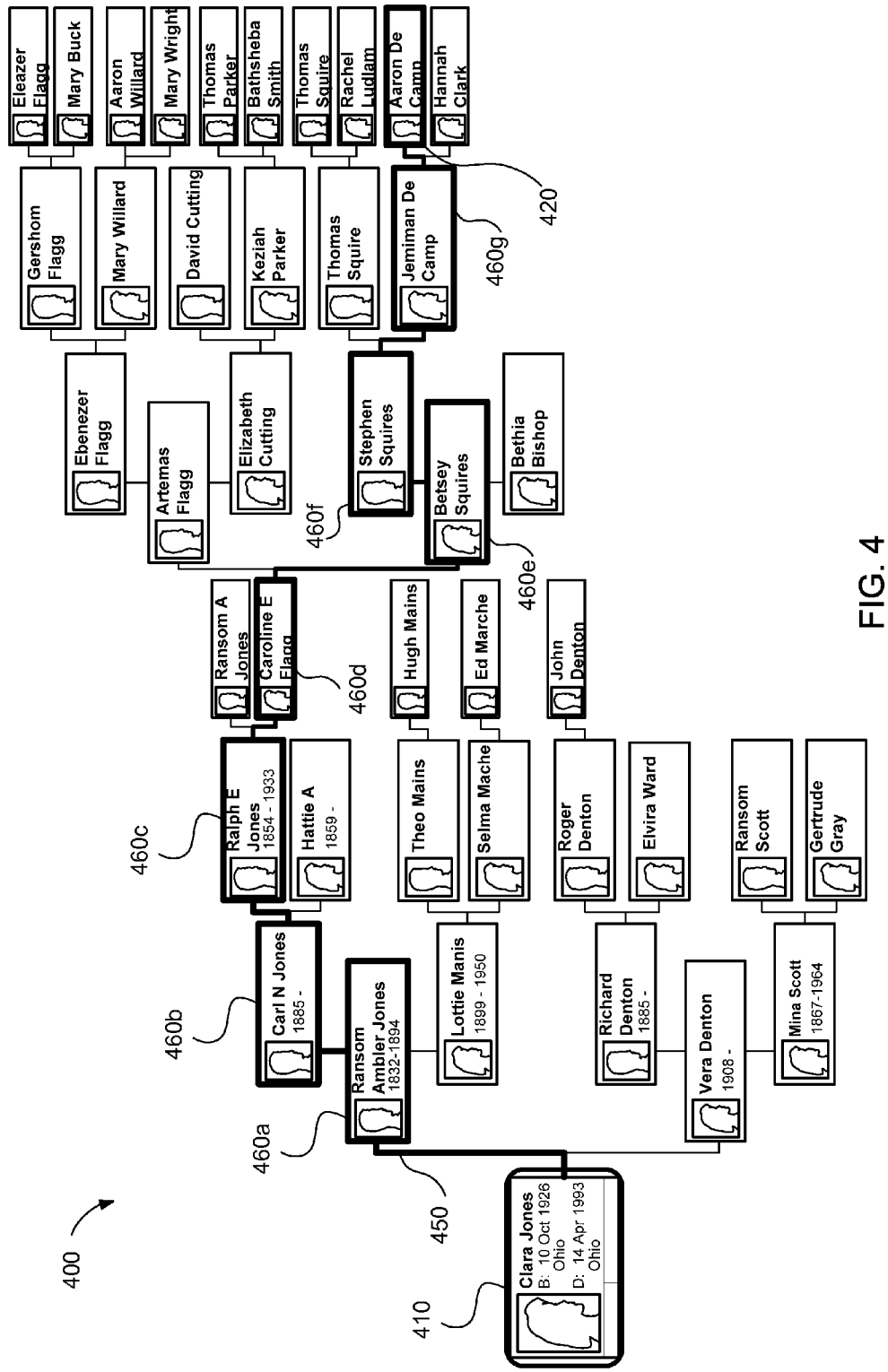
FIG. 4 is an embodiment of a method for displaying a sequence of relationships that connect a first node and a second node.

FIG. 4 illustrates an embodiment of a method 400 for displaying a sequence of nodes and relationships that connect a first node 410 and a second node 420. In this embodiment, a system may graphically display a complex relationship between the first node 410 and the second node 420 by highlighting a pathway 450 between the two nodes comprising one or more individual nodes 460 that lay between the first node 410 and the second node 420. The entire pathway 450 can be displayed at the same time to show a top-level view of complex relationships. This allows a user to see how the relationship pathway 450 traverses various genealogical lines and family branches, even though the display may not be able to show all of the information associated with each node due to sizing constraints.

The top-level view may allow the user to quickly assess the approximate number of generations and family lines separating two family members. However, it may also exclude a portion of the information associated with each node due to hardware, software, user, or display constraints. This may become particularly problematic on smaller display screens, such as those on a tablet computer or smart phone. Various embodiments may further display a "turn-by-turn" sequence of zoomed-in sections of the relationship pathway such that the individual relationships can be examined and more detail associated with each node may be displayed.

Figure 5A:
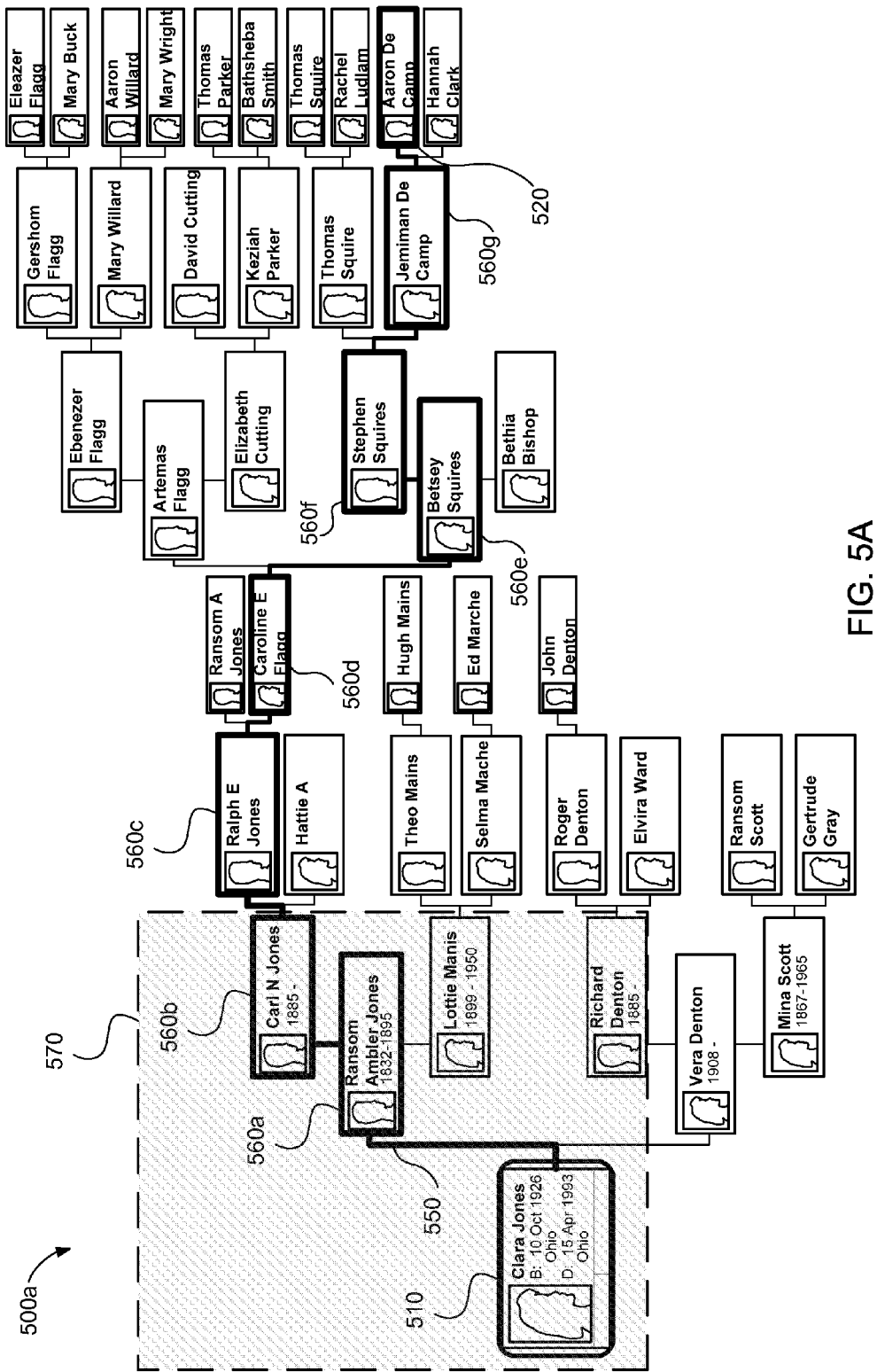
FIGS. 5A, 5B, 5C, 5D, and 5E are embodiments of a method for organizing a sequence of relationships into one or more steps.

FIG. 5A illustrates a partial embodiment of a method 500a for organizing a sequence of relationships into one or more steps. Each step may contain a subset of sequential nodes and relationships that can be displayed simultaneously. In one embodiment, the steps are organized by a predefined number of relationships. For example, a first step 570 having a predefined target number of three display nodes may be comprised of the first three nodes in the relationship, such as nodes 510, 560a and 560b. The target value may be defined in hardware or software and/or changed by the user. It may also be calculated based on a hardware profile or characteristic, such as available memory, the size of the display, and/or the like.

In another embodiment, instead of being a hard target, the predefined number may instead be a minimum value, a maximum value, or an approximate target. When the predefined target value is approximate or a minimum/maximum, the actual number of nodes in each step 570 may be influenced by other factors such as node display size, total number of nodes in the relationship, and/or the like. Merely by way of example, a user could decrease the amount of information to be displayed for a node, and this in turn could increase the number of nodes displayed in each set up to, or approximately equal to, a maximum target number of nodes. Alternatively, the user could increase the amount of information displayed in each node, and the number of nodes displayed in a step could decrease down to, or approximately equal to, a minimum target number of nodes. Additionally, each step 570 may be required to include the same number of nodes, or the number of nodes may differ for each step depending on the other display variables presented in this specification or otherwise know in the art.

In another embodiment, the number of steps in each sequence may depend on a minimum, maximum, or target relationship span. For example, FIG. 5A shows a step 570 comprised of a sequence of nodes wherein the relationship span between the first and last nodes in the sequence is a grandparent-grandchild relationship. Node 510 may be the grandchild, and node 560b may be the grandparent. As another example, the target relationship span could also be comprised of relationships in the vertical direction of a genealogical chart. In other words, the relationships could include a number of sibling relationships, a number of step-brother or step-sister relationships, a number of different marriage partners, and/or the like. Again, the relationship span may be a hard number, or it may be an approximate target that is used in conjunction with any of the other display variables to calculate the actual number of nodes in each step.

In yet another embodiment, the number of nodes in each step and the number of total steps in the sequence may change dynamically as the display parameters are changed. For example, a sequence of steps where each step contains three nodes may be reorganized such that each step contains more than three nodes if a user provides a command to zoom out the display. As another example, a user may set the display to show a particular subset of the nodes in the relationship pathway simultaneously on the display screen. The number of nodes in the display, the span of the relationships in the display, or some other variable based on the user selection may be used as a basis for organizing or reorganizing the relationship pathway into steps. The displayed nodes could comprise one step, and the remaining nodes could be organized into steps that would resemble the same type or number of nodes displayed. The same process for dynamically sizing the steps in the sequence described above could be used in response to any change in the display, such as panning, zooming, changes in resolution, changes in display size, and/or the like.

It should be appreciated by one having skill in the art that these methods of organizing the complex relationship into a sequence of steps are merely representative, and that many other combinations and variations of techniques for doing such may be available.

Figure 5B:
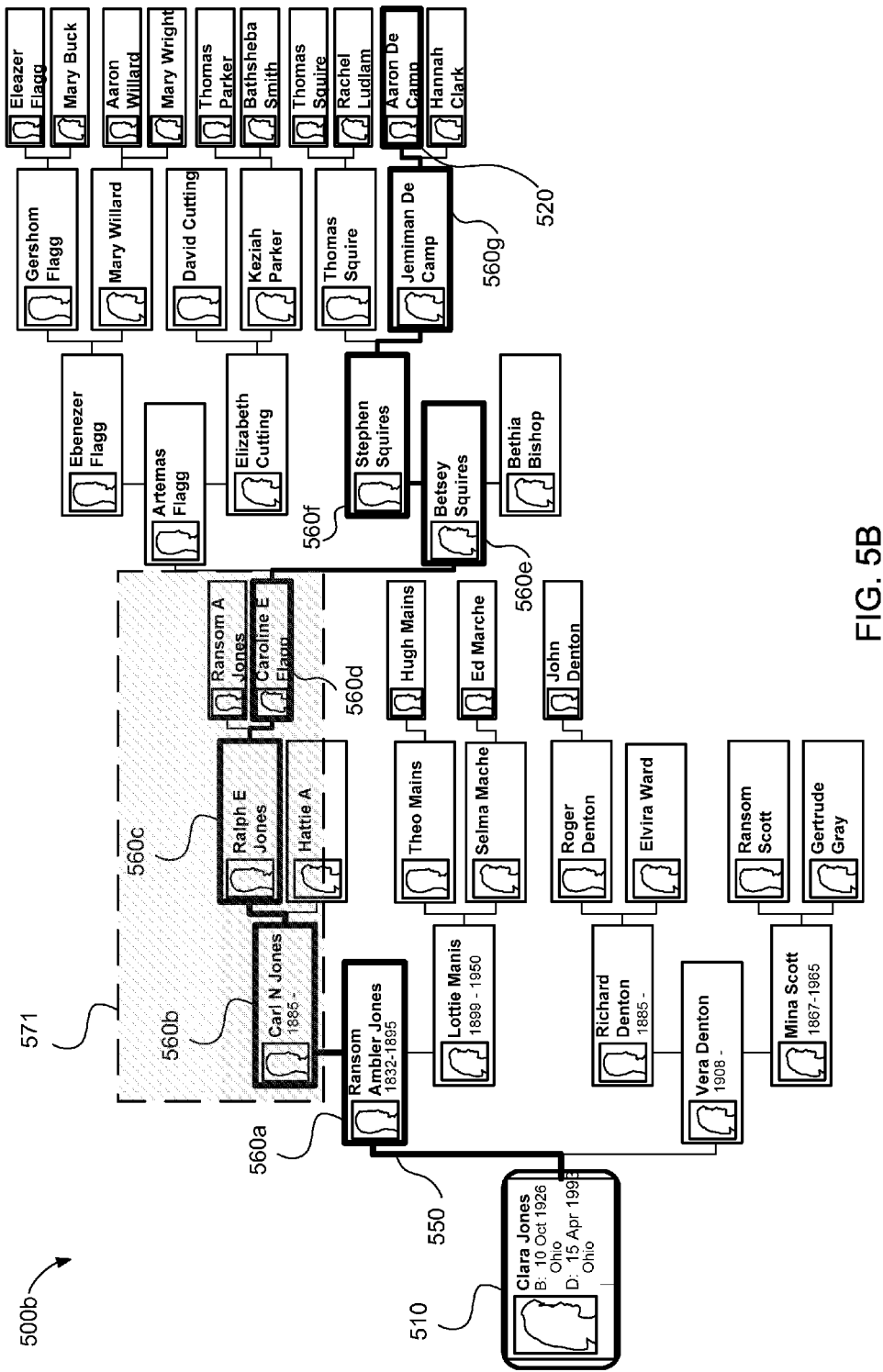

FIG. 5B illustrates an embodiment of a method 500b for organizing a sequence of relationships into additional steps. Steps that are formed subsequent to the first step may contain overlapping nodes. When transitioning between steps on the display, using overlapping nodes may help a user maintain a sense of continuity and position within a complex relationship. In one embodiment, adjacent steps may contain one overlapping node, wherein the last node in a previous step is also the first node in a subsequent step. For example, if the first step 570 shown in FIG. 5A contained nodes 510, 560a, and 560b, then a second step 571 may be organized to include nodes, 560b, 560c, and 560d. Node 560b may be the last node in the first step 570, as well as the first node in the second step 571. Consequently, node 560b would be displayed during both the first step 570 and the second step 571.

Figure 5C:
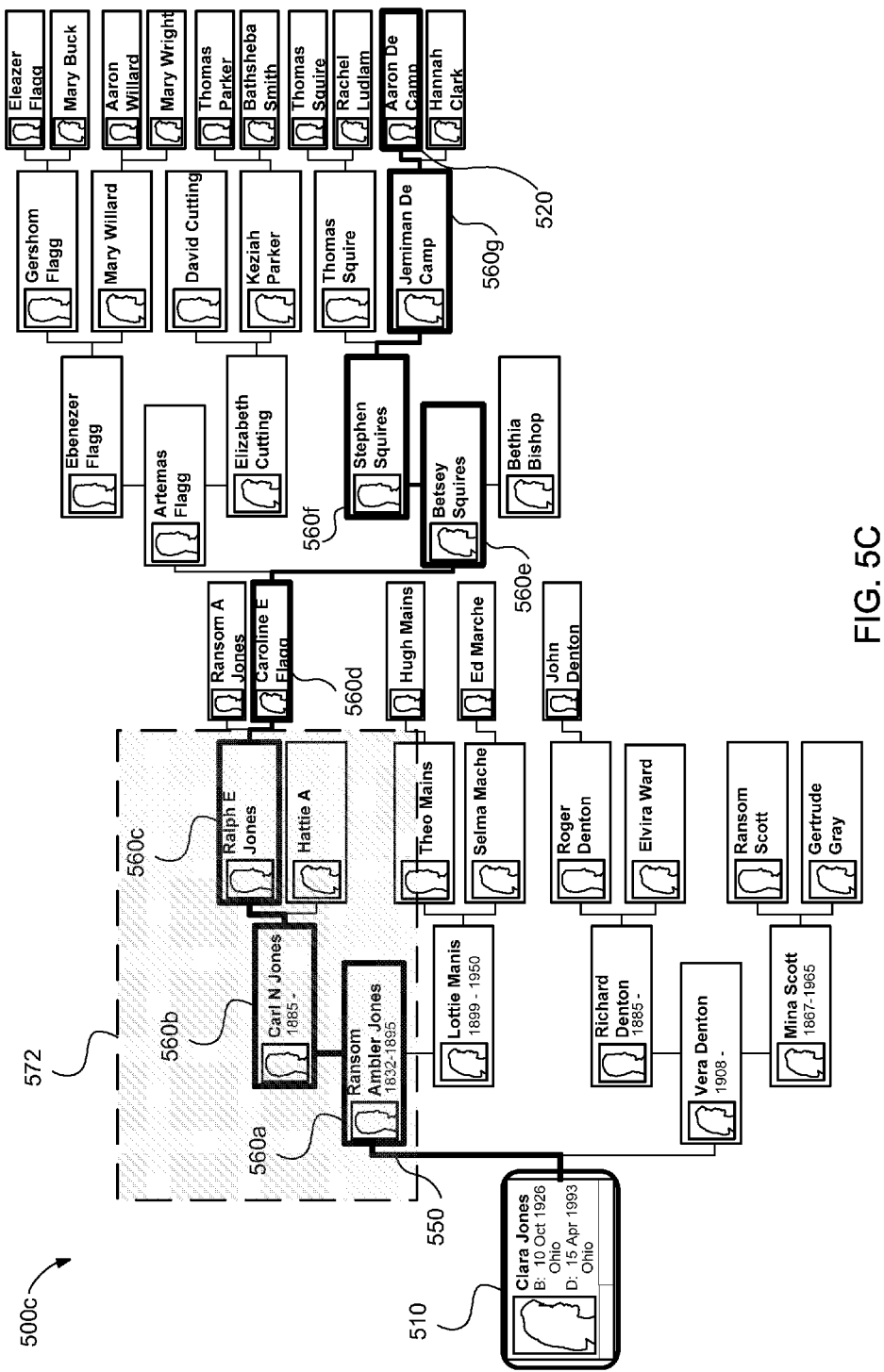

In another embodiment, all of the nodes in two adjacent steps may overlap except for the first node of a previous step and the last node of a subsequent step. FIG. 5C illustrates another embodiment of a method 500c for organizing a sequence of relationships into additional steps. In one embodiment, if the first step 570 shown in FIG. 5A contained nodes 510, 560a, and 560b, then a second step 572 may be organized to include nodes, 560a, 560b, and 560c. Nodes 560a and 560b may be the last nodes in the first step 570, as well as the first nodes in the second step 572. Consequently, node 560a and node 560b would be displayed during both the first step 570 and the second step 572. The first node 510 of the first step 570 and the last node 560c of the second step 572 would only be displayed while their respective steps were displayed (and if they were again included in further subsequent steps). Each step could be organized by removing the first node from the previous step and adding the next node in the sequence not included in the previous step.

Other embodiments include varying numbers of overlapping nodes between adjacent steps. For example, the number of overlapping nodes could span anywhere between zero and a number less than the total number of nodes in each subsequent step. Adjacent steps may also be organized such that there are no overlapping nodes. A user could also specify that certain types of nodes, or nodes connected by certain types of relationships could be excluded from the sequence entirely. Steps could then be organized around these excluded nodes such that no gaps fall within a node. Alternatively, the steps could simply exclude the nodes and be organized without concern for the gaps. The number of overlapping nodes may be the same for each step, or they may be variable, changing in each step based on user preference, size of information associated with each node, display variables, relationship types, and/or the like. It should be appreciated by one having skill in the art that these methods of organizing a complex relationship into a sequence of steps are merely representative, and that many other combinations and variations of techniques for doing such may be available.

Figure 5D:
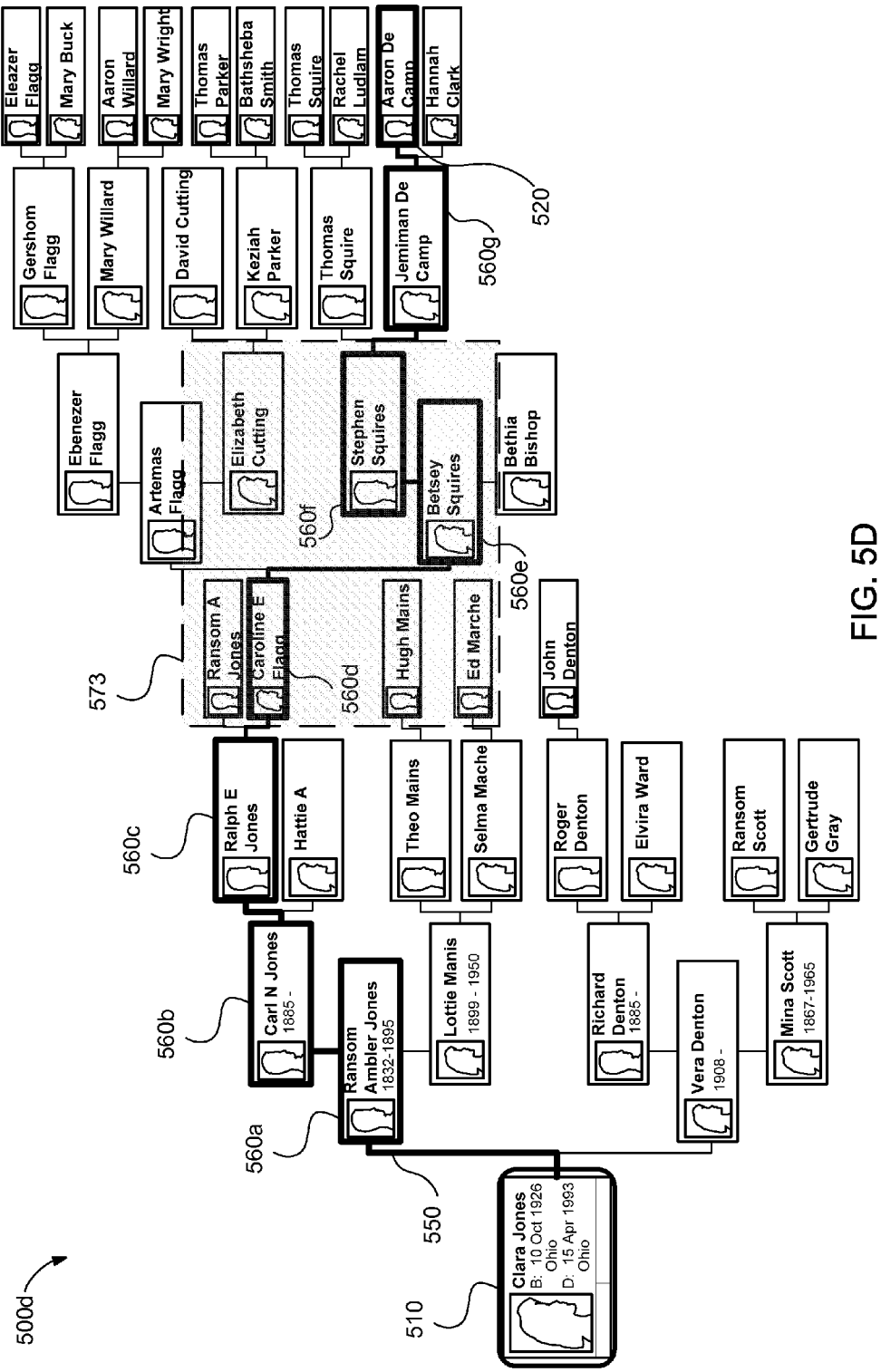

FIG. 5D illustrates an embodiment of a method 500d for organizing a sequence of relationships into additional steps. This embodiment shows a third step 573 organized in accordance with the first step 570 and the second step 571 shown in FIG. 5A and FIG. 5B respectively. One node (node 560d) overlaps between the second step 571 and the third step 573. The third step 573 may be organized to include node 560d, node 560e, and node 560f according to any of the methods previously presented, such as a minimum or maximum of three nodes, a target relationship span of a grandparent-grandchild relationship, the size of the information associated with each node, and/or the like.

Figure 5E:
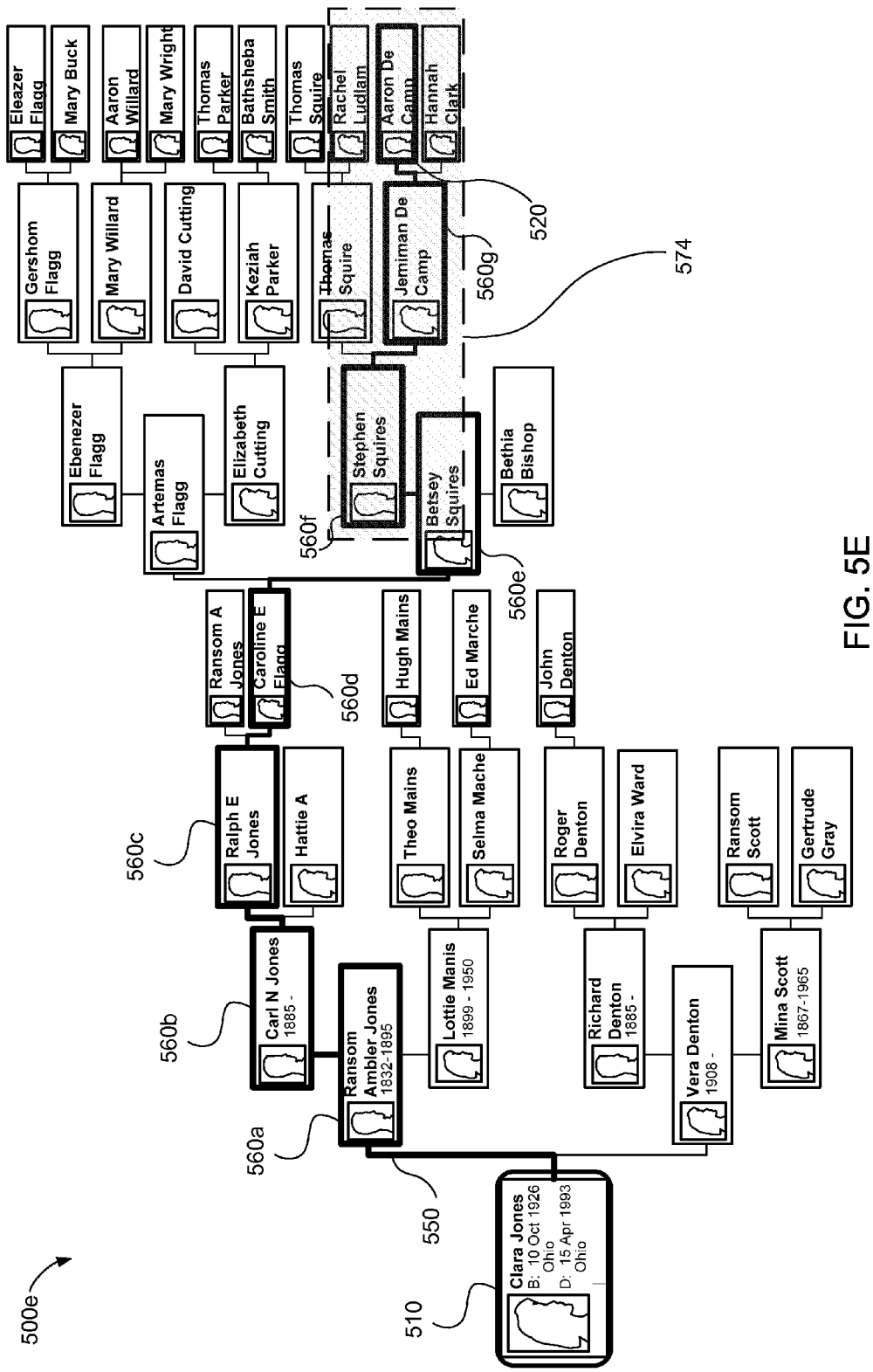

FIG. 5E illustrates an embodiment of a method 500e for organizing a sequence of relationships into additional steps. This embodiment shows a final fourth step 574 that is organized in accordance with the first step 570, the second step 571, and the third step 573 shown in FIG. 5A, FIG. 5B, and FIG. 5D respectively. Node 560e overlaps between the third step 573 and the fourth step 574. The fourth step 574 may be organized to include node 560e, node 560f, and node 520 according to any of the methods previously presented, such as a minimum or maximum of three nodes, a target relationship span of a grandparent-grandchild relationship, the size of the information associated with each node, and/or the like. In some embodiments, the final step 574 may be formed to include the remaining steps left over from the preceding steps, sometimes resulting in a final step that differs from the previous steps in seom way. In this example, the final step contains the same number of steps, size of information, and relationship span as the rest of the steps in the sequence. However, the number of nodes in the final step could be increased or decreased in order to include the remaining steps while still displaying all the desired information in a readable format.

In one embodiment, organizing the nodes in the relationship into steps containing sequential nodes may be done at the outset of the display process. Each step may first be organized, then each step may be displayed in sequence. In another embodiment, the steps are organized in real-time when they are needed for display. Accordingly, the first step may be organized and displayed, then the second step may be organized and displayed, and so forth. The organization of the steps may take place at any time prior to each step's display, and may depend on the available memory, processor availability, a user preference, hardware or software constraint, and/or the like. Dynamic sizing of steps may also occur in response to changes in the display parameters. For example, a user could change the viewing area, pan, zoom in, zoom out, and/or the like. Such changes may cause the current step to resize according to the new viewing parameters. Consequently, the other steps in the sequence may also need to be recalculated in response to this type of change.

Figure 6A:
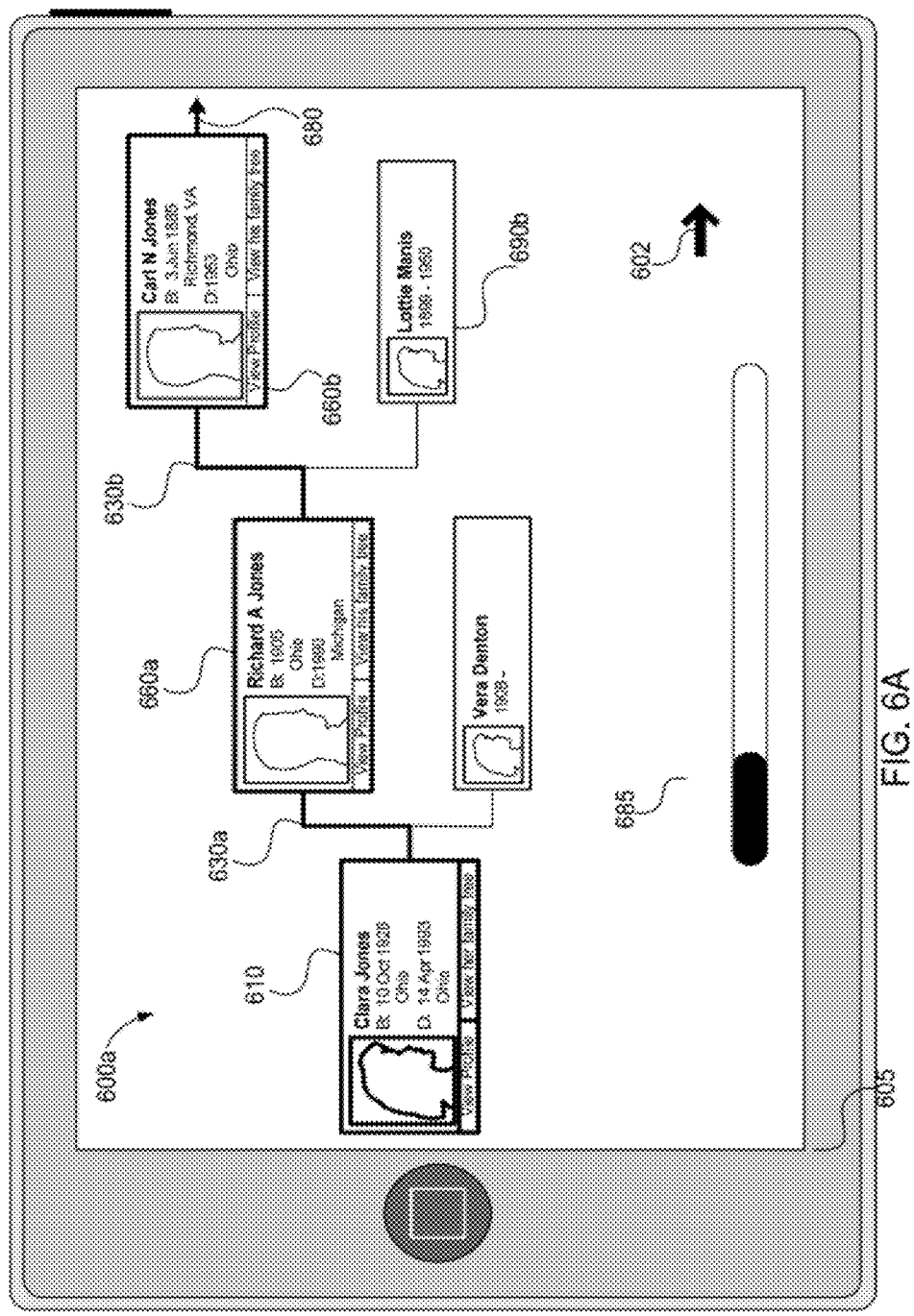
FIGS. 6A, 6B, 6C, and 6D are embodiments of a method for sequentially displaying the nodes and relationships in each step on a display device.

FIG. 6A illustrates an embodiment of sequentially displaying the nodes and relationships in a step 600a on a display device in accordance with aspects of the present invention. In this embodiment, the first step 570 shown in FIG. 5A is displayed on a display device 605 similar to a tablet computer, a smart phone, a digital music player, a digital assistant, and/or the like. As a display of this type may be too small show the entire relationship pathway with a useful level of detail, this embodiment displays steps sized to show the information associated with each node in the step on the display screen. The nodes in the first step, comprising node 610, node 660a, and node 660b, are displayed, as well as the other surrounding nodes 690a and 690b in the genealogical chart that are not a part of the relationship pathway. In this embodiment, nodes 610, 660a, and 660b in the relationship pathway are highlighted with a thicker border than node 690a and node 690b that are not a part of the relationship pathway. In other embodiments, nodes 610, 660a, and 660b in the relationship pathway may be highlighted by changing the color of nodes, by outlining the nodes with a heavier pattern or line weight, by adding a graphical designation such as a star or asterisk, or by any other method that would distinguish nodes 610, 660a, and 660b in the relationship pathway from the surrounding nodes 690a and 690b. The relationship connectors 630a and 630b in the relationship pathway may also be highlighted according to any of these methods such that they are distinguished from any relationship connectors that are not a part of the relationship pathway. In another embodiment, the surrounding nodes are not displayed at all in order to avoid distracting from the nodes in the relationship pathway. In yet another embodiment, the surrounding nodes 690a and 690b are faded, grayed out, or otherwise changed to lessen their visible impact.

In the embodiment shown in FIG. 6A, nodes 610, 660a, and 660b in the relationship pathway also display more information associated with the nodes than surrounding nodes 690a and 690b. The information includes a name, large picture, date and place of birth, date and place of death, and hyperlinks to additional information that can be optionally displayed. The surrounding nodes 690a and 690b display a name, small picture, date of birth, and date of death. In some embodiments, the nodes in the relationship pathway display all the information associated with the nodes, while in other embodiments, only a subset is shown with optional links to a full list of information associated with node. In yet another embodiment, the nodes in the relationship pathway display the same amount of information as the surrounding nodes. Furthermore, the relative amount of information displayed between the nodes in the relationship pathway and the surrounding nodes may be determined dynamically based on the display size, user preference, or other such variables. For example, preference could be given to the information associated with the pathway nodes, such that once the information associated with the pathway nodes is displayed, the information displayed in the surrounding nodes could be sized to display as much as possible without infringing upon the space needed to fully display the information associated with the relationship pathway nodes.

A directional device 680 may be used to show the user a relative direction in which more of the relationship pathway may be displayed. In one embodiment, the directional device 680 is an arrow pointing in the direction that a discontinued corresponding relationship connector would continue off the screen. This may indicate that the relationship pathway continues in a direction that, in this example, continues in a parental relationship direction. In another embodiment, the directional device 680 is simply a relationship connector that continues off the viewable area of the screen on the right hand side of the display. In this arrangement, when the display transitions between steps, the directional device 680 would continue as a relationship connector as the next node became visible on the screen. In another embodiment, the directional device 680 may also point in other directions corresponding to child, sibling, marriage, and/or other such relationship. In one embodiment, for a relationship that continued through an off-screen sibling, the directional device 680 would point towards the top or bottom of the screen 605, instead of to the right as illustrated in FIG. 6A. In yet another embodiment, a directional device 680 may be displayed for each of the relationships that continue off screen that are not a part of the relationship pathway. For example, in FIG. 6A, nodes 690*a* and 690*b* could also display directional devices 680 in the sibling, parent, and/or child direction. Following these directional devices outside of the relationship pathway may take the display away from the currently displayed step 600*a*. If one of the steps in the relationship pathway were subsequently brought back into the display, or if an input was provided to signal a transition to the next step, the system could continue sequentially displaying the subsequent steps in the relationship pathway.

When the first step 600*a* in the sequence has been displayed for a sufficient period of time, the system may move to display the next step in the sequence. In one embodiment, the transition between steps may result from a user input, such as selecting a "forward" button 602, selecting the directional device 680, using a finger gesture on a touch screen, pressing a key on a keyboard, and/or the like. In another embodiment, the transition may also occur without user input as the result of a timer or other automated input.

Figure 6B:
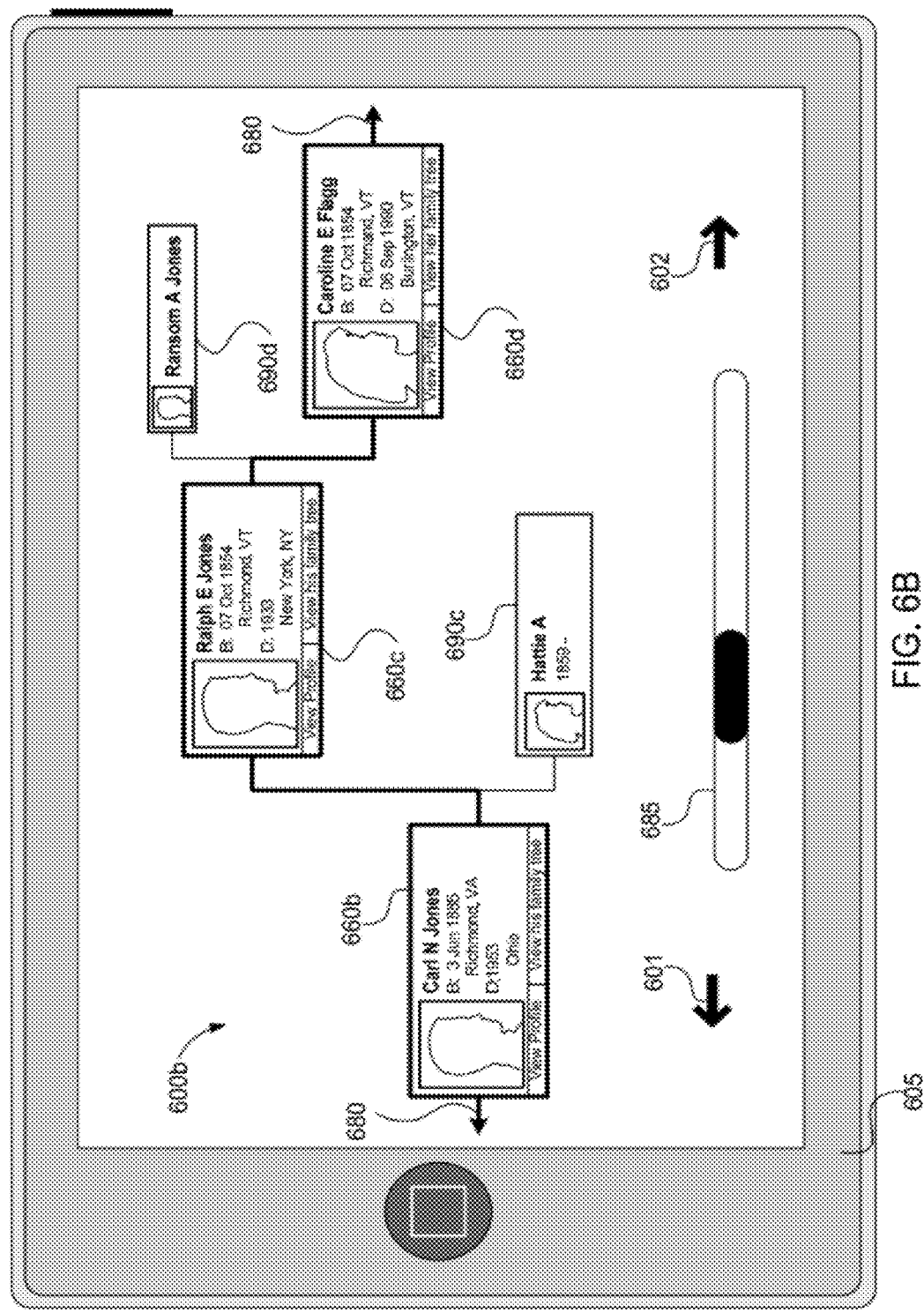

FIG. 6B illustrates an embodiment of sequentially displaying the nodes and relationships in a subsequent step 600*b* on a display device 605. Merely by way of example, second step 600*b* is comprised of nodes 660*b*, 660*c*, and 660*d*, corresponding to the step 571 selection illustrated in FIG. 5B. It should be appreciated that the display of any subsequent steps may be divided according to any of the methods recited herein, and should not be limited to the illustrative examples in FIG. 6A and FIG. 6B.

In this embodiment, the display of the second step 600*b* uses the same formatting for the information associated with each node that was used in displaying the first step 600*a* in FIG. 6A. The relationship pathway nodes 660*b*, 660*c*, and 660*d* are highlighted with a thicker border and the information associated with the non-pathway nodes is limited to a name, picture (if available), birth date, and death date. In other embodiments, the amount of information displayed for the nodes in each step is not dependent on the amount of information displayed for the nodes in the previous or subsequent steps, and may be determined automatically and/or independently. For example, the first step 600*a* might only display full information for the pathway nodes, while the second step 600*b* may display full information for all of the nodes on the display regardless of the whether or not they belong to the relationship pathway.

The transition between adjacent steps may be displayed in various ways. In one embodiment, the display may move continuously between the displays of the two steps such that the transition appears to be an animated motion between two portions of the larger genealogical chart. This may result in continuously displaying the nodes that are common to two adjacent steps throughout the transition. In another embodiment, the transition happens instantaneously without any animation. In yet another embodiment, the display of the first step 600*a* may zoom out to a larger view of the genealogical chart—perhaps showing the entire chart—before the display zooms back in to focus on the second step 600*b*. Other embodiments may incorporate various other transition methods between the displays, such as fading, morphing, turning pages like a book, and/or the like. It should be appreciated that these transitions are applicable to each transition between steps in the sequence, and different methods may be used for each transition.

Figure 6C:
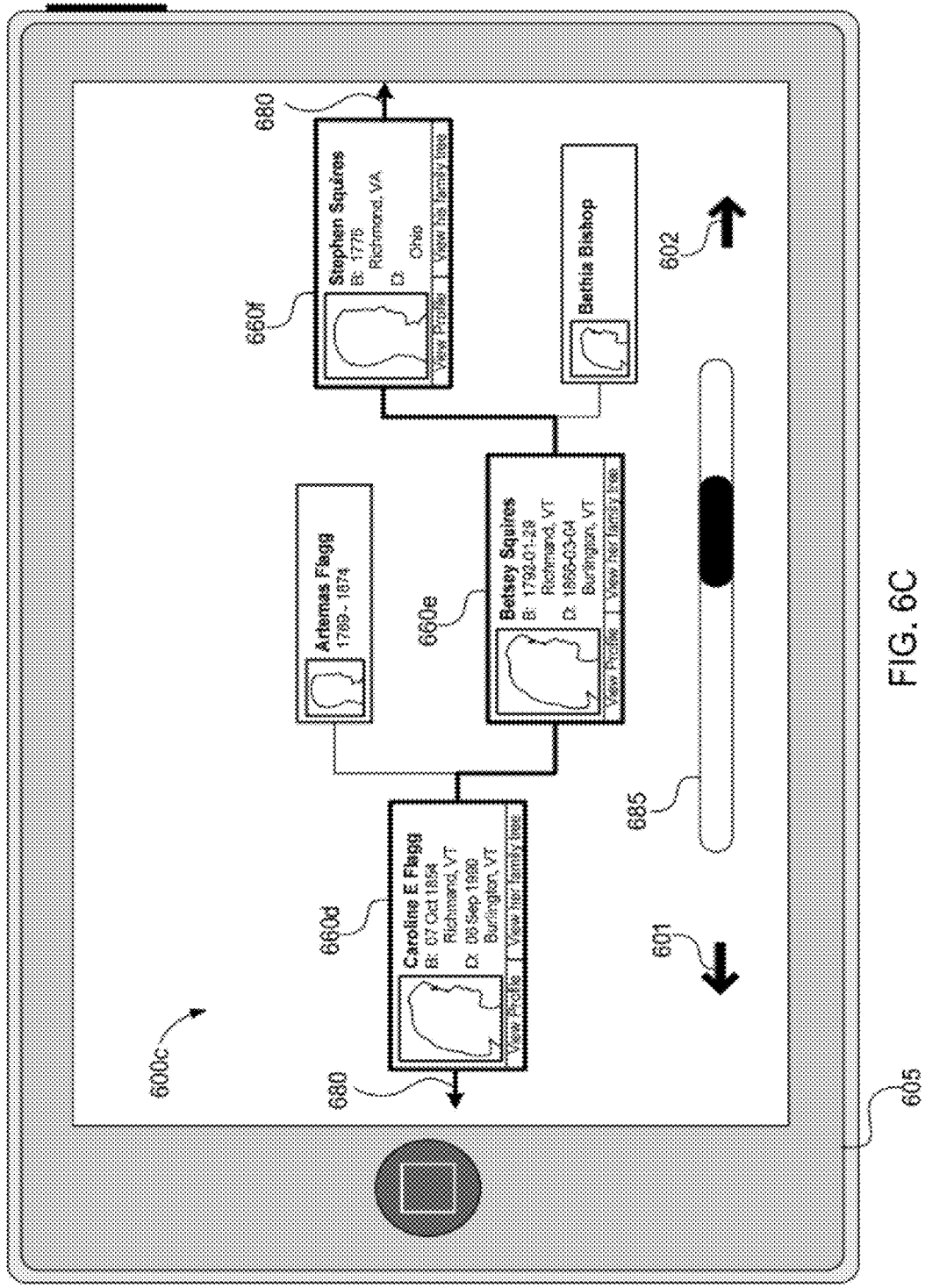

FIG. 6C illustrates an embodiment of sequentially displaying the nodes and relationships in a subsequent step 600*c* on a display device 605. Merely by way of example, step 600*c* is comprised of nodes 660*d*, 660*e*, and 660*f*, corresponding to the third step 573 selection illustrated in FIG. 5D. It should be appreciated that the display of any subsequent steps may be divided and displayed according to any of the methods recited herein, and should not be limited to the illustrative example in FIG. 6C.

The display may move both backwards and forwards through the steps in the relationship pathway. In displaying steps in the middle of the sequence, there may be multiple directional devices 680 used to indicate additional off-screen steps in the relationship pathway. In the embodiment illustrated in FIG. 6C, there are two directional devices 680, one pointing to the left of node 660*d* and another pointing to the right of node 660*f* in the displayed step 600*c*. By following the directional device 680 on the left, the display would show the previous step 600*b* in the sequence. By following the direction device 680 on the right, the display would show the subsequent step 600*d* in the sequence.

Figure 6D:
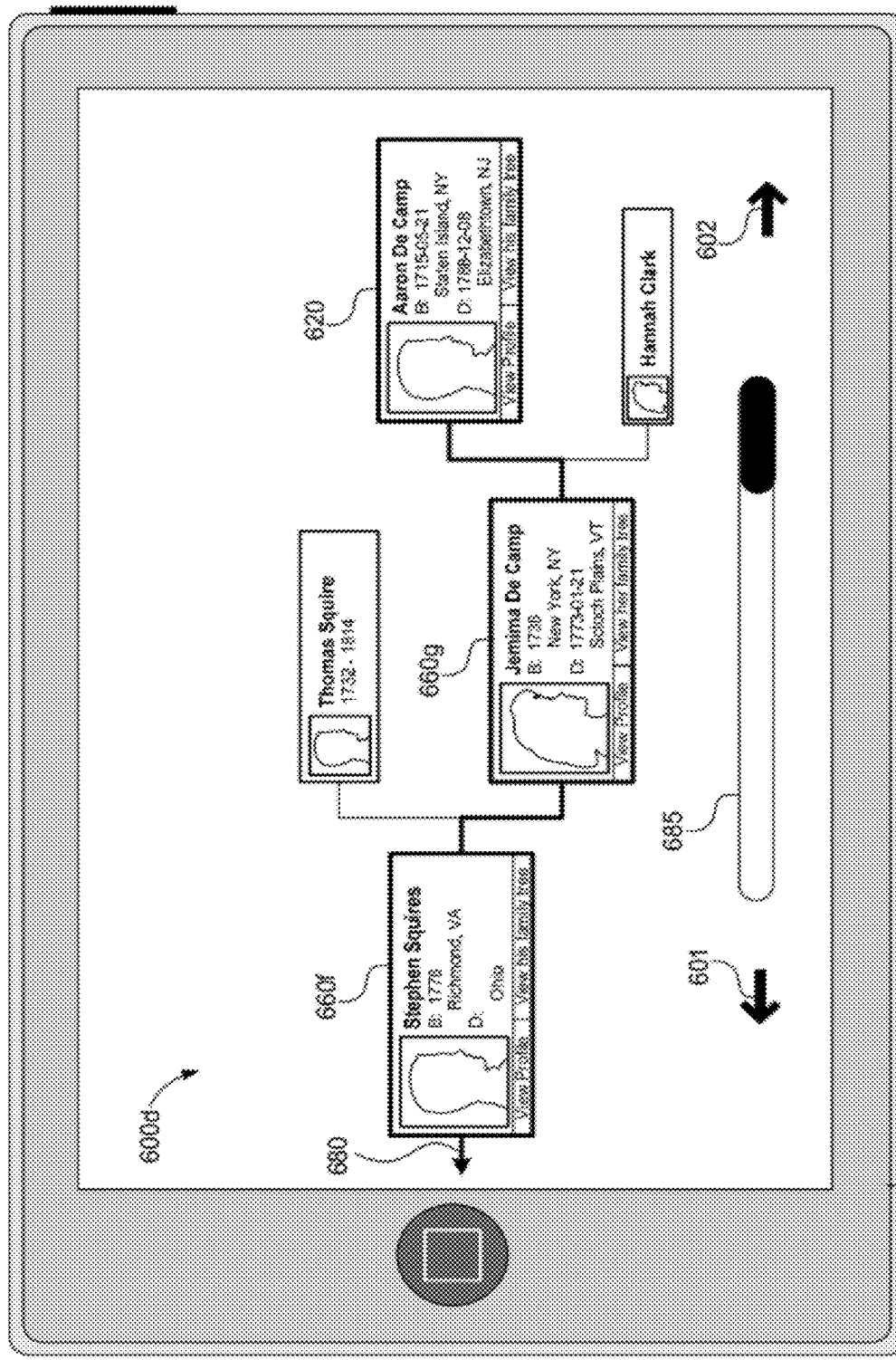

FIG. 6D illustrates an embodiment of sequentially displaying the nodes and relationships in a final step 600*d* on a display device 605. Merely by way of example, step 600*d* is comprised of nodes 660*f*, 660*g*, and 620, corresponding to the fourth or final step 574 selection illustrated in FIG. 5E. In this embodiment, the final step 600*d* in the sequence shows a directional device 680 pointing to the left of node 660*f* without a corresponding directional device 680 pointing to the right of the final node 620 in the sequence. This may be used to indicate that the final step 600*d* is currently being display. In another embodiment, a input may be provided that allows that user to start over from the beginning of the sequence of steps.

FIGS. 6A-6D also illustrate an embodiment of a progress indicator 685 that may be displayed along with each step in the relationship pathway. The progress indicator 685 may be used to indicate the relative position of the currently displayed step within the relationship pathway. The progress indicator 685 may also be used as a control, allowing a user to manipulate the progress indicator 685 to navigate through the relationship pathway. In this embodiment, the progress indicator 685 is a horizontal scroll bar, which may correspond to the horizontal (left and right) direction of the directional devices 680. If the directional devices 680 corresponded to sibling relationships in the vertical direction, the progress indicator 685 may become a vertical scroll bar. In some embodiments, each step may have its own type of progress indicator 685 that corresponds to the type and direction of the relationships displayed in the step.

Figure 7:
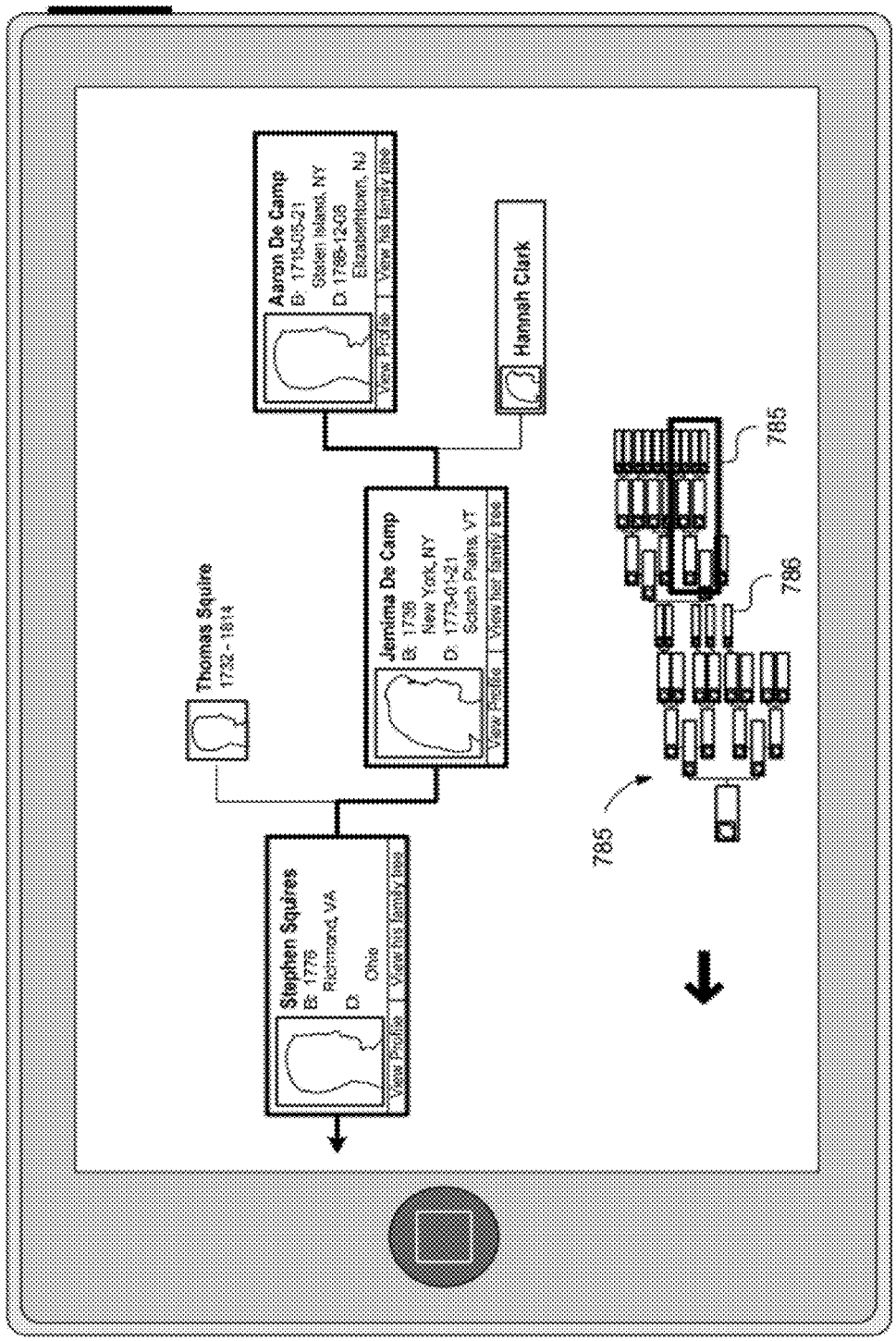
FIG. 7 is an embodiment of a progress indicator.

FIG. 7 illustrates another embodiment of a progress indicator 785 that may be displayed along with each step in the relationship pathway. In this embodiment, the progress indicator 785 is comprised of a small view of a larger portion of the genealogical chart 786. A box 787 or other similar graphical indicator may be used to show the portion of the genealogical chart 786 that is currently being displayed as a part of the current step. The user may use this type of visual indicator as a control to navigate around the genealogical chart using the current zoom size of the display. As the portion of the genealogical chart 786 shown in the display changes, the size and partitioning of the steps in the sequence may be recalculated to accommodate the new portion of the chart corresponding to the box 787 in the indicator.

Top-level information and information associated with the complex relationship, such as the number of relationships in the sequence, the current position in the sequence, the current position in the genealogical chart, and/or the like, may be available at any time while stepping through the relationship pathway. In one embodiment, the display may zoom out to a larger view, allowing a user to back out from the zoomed-in view of an individual step to assess the current position in the chart. From this zoomed-out view the display may revert back to the current step in the relationship pathway or to another previous or subsequent step.

In many of the embodiments described herein, a textual description of the relationship may be provided. The textual description may describe the portion of the relationship pathway that is currently displayed on the screen, and thus may change during the display of each step. For example, the text could read "X is the grandson of Y." Alternatively, the text could describe the entire complex relationship without regard for the portion displayed in the current step. For example, the text could read "X is the great, great, great, great, grandson of Y." A textual description may also be made available according to a user input, or displayed according to any other parameter.

Figure 8:
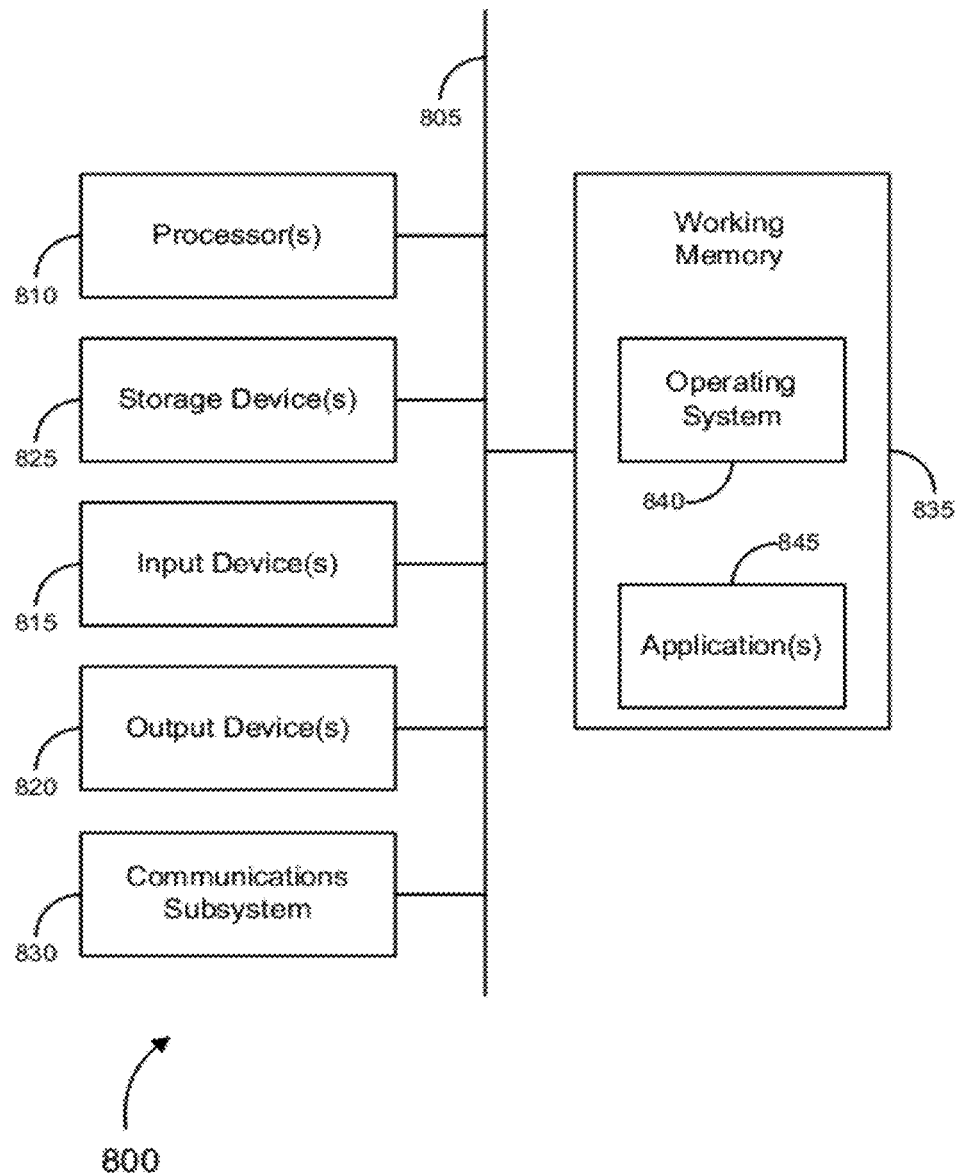
FIG. 8 is a generalized schematic diagram illustrating a computer system for implementing aspects of the present invention.

FIG. 8 provides a schematic illustration of one embodiment of a computer system 800 that can perform the methods of the invention, as described herein. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements can include one or more processors 810, including without limitation, one or more general purpose processors and/or one or more special purpose processors (such as digital signal processing chips, math co-processors, floating-point units, graphics acceleration chips, and/and/or the like); one or more input devices 815, which may include without limitation a mouse, a keyboard and/or the like; and one or more output devices 820, which can include without limitation a display device, a printer, multi-touch (e.g., Apple™ iPhone, Apple™ iPad, Microsoft™ Surface™, etc.) and/or the like.

The computer system 800 may further include (and/or be in communication with) one or more storage devices 825, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 800 might also include a communications subsystem 830, which can include without limitation a modem, a network card (wireless or wired), an infrared communication device, a wireless communication device and/or chipset (such as a Bluetooth™ device, an 902.11 device, a WiFi device, a WiMax device, cellular communication facilities, etc.), and/or the like. The communications subsystem 830 may permit data to be exchanged with a network (such as the network described below, to name one example), and/or any other devices described herein. In many embodiments, the computer system 800 will further comprise a working memory 835, which can include a RAM or ROM device (as described above), a cache memory, registers, and/or the like.

The computer system 800 also can comprise software elements, shown as being currently located within the working memory 835, including an operating system 840 and/or other code, such as one or more application programs 845, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 800) to perform methods of the invention. According to a set of embodiments, some or all of the procedures of such methods are performed by the computer system 800 in response to processor(s) 810 executing one or more sequences of one or more instructions (which might be incorporated into the operating system 840 and/or other code, such as an application program 845) contained in the working memory 835. Such instructions may be read into the working memory 835 from another machine-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 800, various machine-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media may include, for example, optical or magnetic disks, such as the storage device(s) 825. Volatile media may include, without limitation, dynamic memory, such as the working memory 835. Transmission media may include coaxial cables, copper wire and fiber optics, including the wires that comprise the bus 805, as well as the various components of the communications subsystem 830 (and/or the media by which the communications subsystem 830 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc., carried by the signals) to the working memory 835, from which the processor(s) 810 retrieves and executes the instructions. The instructions received by the working memory 835 may optionally be stored on a storage device 825 either before or after execution by the processor(s) 810.

Figure 9:
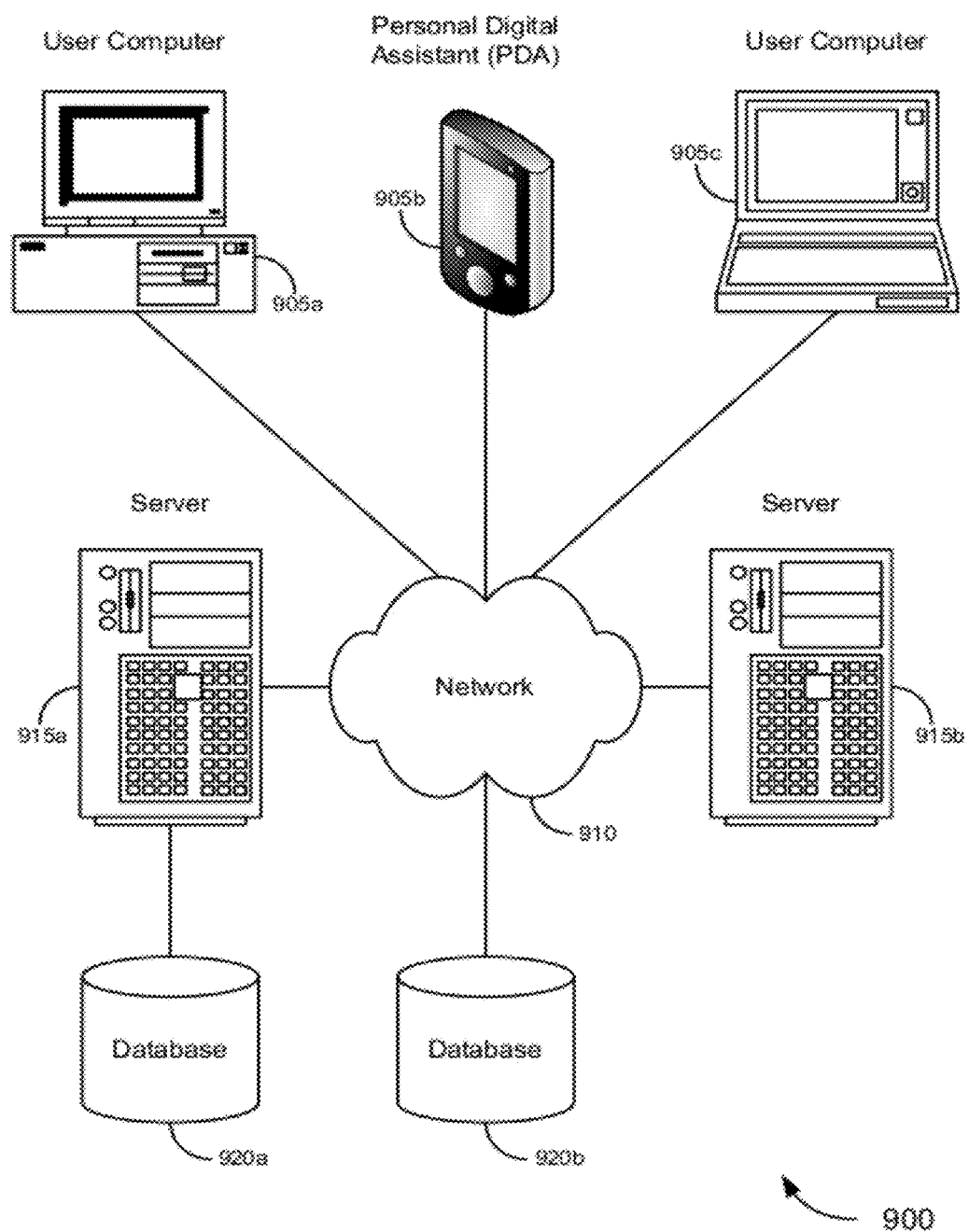
FIG. 9 is a block diagram illustrating a networked system of computers for implementing aspects of the present invention.

Merely by way of example, FIG. 9 illustrates a schematic diagram of a system 900 that can be used in accordance with one set of embodiments. The system 900 can include one or more user computers 905. The user computers 905 can be general purpose personal computers (including, merely by way of example, personal computers, tablet computers, and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 905 can also have any of a variety of applications, including one or more applications configured to perform methods of the invention, as well as one or more office applications, database client and/or server applications, and web browser applications. Alternatively, the user computers 905 can be any other electronic device, such as a thin-client computer, Internet-enabled mobile telephone, smart phone, cellular phone, digital music player, and/or personal digital assistant (PDA), capable of communicating via a network (e.g., the network 910 described below) and/or displaying and navigating web pages or other types of electronic documents. Although the exemplary system 900 is shown with three user computers 905, any number of user computers can be supported.

Certain embodiments of the invention operate in a networked environment, which can include a network 910. The network 910 can be any type of network familiar to those skilled in the art that can support data communications using any of a variety of commercially available protocols, including without limitation TCP/IP, SNA, IPX, AppleTalk, and the like. Merely by way of example, the network 910 can be a local area network ("LAN"), including without limitation an Ethernet network, a Token-Ring network and/and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 915. Each of the server computers 915 may be configured with an operating system, including without limitation any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 may be a web server, which can be used, merely by way of example, to process requests for web pages or other electronic documents from user computers 905. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 905 to perform methods of the invention.

The server computers 915, in some embodiments, might include one or more application servers, which can include one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, Ruby, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 905 and/or another server 915. In some embodiments, an application server can create web pages dynamically for displaying the information in accordance with embodiments of the invention. Data provided by an application server may be formatted as web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases a web server may be integrated with an application server.

In accordance with further embodiments, one or more servers 915 can function as a file server and/or can include one or more of the files (e.g., application code, data files, etc.) necessary to implement methods of the invention incorporated by an application running on a user computer 905 and/or another server 915. Alternatively, as those skilled in the art will appreciate, a file server can include all necessary files, allowing such an application to be invoked remotely by a user computer 905 and/or server 915. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920. The location of the database(s) 920 is discretionary. Merely by way of example, a database 920a might reside on a storage medium local to (and/or resident in) a server 915a (and/or a user computer 905). Alternatively, a database 920b can be remote from any or all of the computers 905, 915, so long as the database can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle™ database, that is adapted to store, update, and retrieve data in response to SQL-formatted commands. The database might be controlled and/or maintained by a database server, as described above, for example.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for implementing an interactive display of ancestor-to-ancestor relationships, the method comprising:
displaying on a display device of a computer system, a user interface for displaying one or more genealogical charts including one or more nodes;
receiving, together in a single step from an input device of the computer system, a selection of two nodes, the two nodes comprising a first node and a second node;
in response to receiving the selection of the first and second nodes, calculating a sequence of relationships connecting the first node to the second node;
organizing the sequence of relationships into steps, wherein each step contains a predetermined number of one or more sequential nodes and relationships that can be displayed at the same time;
automatically and sequentially displaying the nodes and relationships in each step on the display device, wherein each step is displayed separately one-at-a-time, and wherein, by sequentially displaying all of the steps, the entire sequence of relationships connecting the first node to the second node is displayed; and
displaying a progress indicator with each step, the progress indicator comprising a view of a genealogical chart with a graphical indicator showing a portion of the genealogical chart representing the displayed step.

2. A method for implementing an interactive display of ancestor-to-ancestor relationships as in claim 1, wherein the number of nodes and relationships in each step is determined in part by the size of the display and the portion of the display used to display a set of information related to each node.

3. A method for implementing an interactive display of ancestor-to-ancestor relationships as in claim 1, wherein the number of nodes and relationships in each step is determined by a target number of relationships.

4. A method for implementing an interactive display of ancestor-to-ancestor relationships as in claim 1, wherein the number of nodes and relationships in each step corresponds to a grandparent-to-grandchild sequence of nodes.

5. A method for implementing an interactive display of ancestor-to-ancestor relationships as in claim 1, wherein each step in the sequence contains at least one node from a previous step if it exists, and at least one node from a subsequent step if it exists.

6. A method for implementing an interactive display of ancestor-to-ancestor relationships as in claim 1, wherein each node belongs to only a single step.

7. A method for implementing an interactive display of ancestor-to-ancestor relationships as in claim 1, wherein sequentially displaying the nodes and relationships in each of the steps on the display device further comprises displaying a link to additional information as a part of one or more of the nodes.

8. A method for implementing an interactive display of ancestor-to-ancestor relationships as in claim 1, wherein sequentially displaying each of the steps further comprises receiving, from an input device of the computer system, an input instructing the display to display each step in the sequence.

9. A method for implementing an interactive display of ancestor-to-ancestor relationships as in claim 8, wherein the input comprises a finger gesture performed on the display device by a user.

10. A method for implementing an interactive display of ancestor-to-ancestor relationships as in claim 1, wherein sequentially displaying each of the steps further comprises receiving, from a timer implemented in the computer system, a signal instructing the display to display each step in the sequence.

11. A method for implementing an interactive display of ancestor-to-ancestor relationships as in claim 1, further comprising outputting, from an output device of the computer system, a description of the relationship between a first node and a last node in the current step.

12. A method for implementing an interactive display of ancestor-to-ancestor relationships as in claim 1, further comprising outputting, from an output device of the computer system, a description of a relationship between the first node and the last node in the sequence.

13. A method for implementing an interactive display of ancestor-to-ancestor relationships as in claim 1, wherein the predetermined number of sequential nodes and relationships in at least two of the steps is the same.

14. A method for implementing an interactive display of ancestor-to-ancestor relationships as in claim 1, wherein the predetermined number of sequential nodes and relationships in at least 2 of the steps is different.

15. A non-transitory computer-readable storage medium having a computer-readable program embodied therein for directing operation of a computer system, including a processor and a storage device, wherein the computer-readable program includes instructions for operating the computer system to:
   display a user interface for displaying one or more genealogical charts including one or more nodes;
   receive together a selection of two nodes, the two nodes comprising a first node and a second node;
   in response to receiving the selection of the first and second nodes, calculate a sequence of relationships connecting the first node to the second node;
   organize the sequence of relationships into steps, wherein each step contains a predetermined number of one or more sequential nodes and relationships that can be displayed at the same time;
   automatically and sequentially display the nodes and relationships in each step, wherein each step is displayed separately one-at-a-time, and wherein, by sequentially displaying all of the steps, the entire sequence of relationships connecting the first node to the second node is displayed; and
   displaying a progress indicator with each step, the progress indicator comprising a view of the genealogical chart with a graphical indicator showing a portion of the genealogical chart representing the displayed step.

16. A non-transitory computer-readable storage medium as in claim 15, wherein the number of nodes and relationships in each step is determined in part by the size of the display and the portion of the display used to display the information related to each node.

17. A non-transitory computer-readable storage medium as in claim 15, wherein the number of nodes and relationships in each step corresponds to a grandparent-to-grandchild sequence of nodes.

18. A non-transitory computer-readable storage medium as in claim 15, wherein the number of nodes and relationships in each step is determined by a target number of relationships.

19. A non-transitory computer-readable storage medium as in claim 15, output, wherein the computer-readable program further includes instructions for operating the computer system to output, from an output device of the computer system, a description of a relationship between the first node and the last node in the sequence.

20. A method for implementing an interactive display of ancestor-to-ancestor relationships, the method comprising:
   displaying on a display device of a computer system, a user interface for displaying one or more genealogical charts including one or more nodes;
   receiving, together in a single step from an input device of the computer system, a selection of two nodes, the two nodes comprising a first node and a second node;
   in response to receiving the selection of the first and second nodes, calculating a sequence of relationships connecting the first node to the second node;
   organizing the sequence of relationships into steps, wherein each step contains a predetermined number of one or more sequential nodes and relationships that can be displayed at the same time;
   automatically and sequentially displaying the nodes and relationships in each step on the display device, wherein each step is displayed separately one-at-a-time, and wherein, by sequentially displaying all of the steps, the entire sequence of relationships connecting the first node to the second node is displayed; and
   wherein each step in the sequentially displayed steps comprises at least one node from a previous step if it exists, and at least one node from a subsequent step if it exists, in order to provide a transition between steps.

21. A method for implementing an interactive display of ancestor-to-ancestor relationships, the method comprising:
   displaying on a display device of a computer system, a user interface for displaying one or more genealogical charts including one or more nodes;
   receiving, together in a single step from an input device of the computer system, a selection of two nodes, the two nodes comprising a first node and a second node;
   in response to receiving the selection of the first and second nodes, calculating a sequence of relationships connecting the first node to the second node;
   organizing the sequence of relationships into steps, wherein each step contains a predetermined number of one or more sequential nodes and relationships that can be displayed at the same time;

automatically and sequentially displaying the nodes and relationships in each step on the display device, wherein each step is displayed separately one-at-a-time, and wherein, by sequentially displaying all of the steps, the entire sequence of relationships connecting the first node to the second node is displayed; and wherein between at least two sequentially displayed steps, there is displayed a genealogical chart having at least the first and second nodes, in order to provide a transition between sequentially displayed steps.

* * * * *